(12) United States Patent
Murray

(10) Patent No.: US 7,463,304 B2
(45) Date of Patent: Dec. 9, 2008

(54) REMOTE CONTROL ACCESSORY FOR A CAMERA-EQUIPPED WIRELESS COMMUNICATIONS DEVICE

(75) Inventor: Matthew J. Murray, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 894 days.

(21) Appl. No.: 10/839,959

(22) Filed: May 6, 2004

(65) Prior Publication Data

US 2005/0249486 A1  Nov. 10, 2005

(51) Int. Cl.
*H04N 5/222* (2006.01)
*H04N 5/232* (2006.01)

(52) U.S. Cl. .................... 348/371; 348/211.4

(58) Field of Classification Search .......... 348/370, 348/371, 211.2, 211.4, 211.8, 211.9; 356/219
See application file for complete search history.

(56) References Cited

U.S. PATENT DOCUMENTS

| | | | | |
|---|---|---|---|---|
| 5,713,055 A | * | 1/1998 | Lawther et al. | 396/165 |
| 6,034,722 A | * | 3/2000 | Viney et al. | 348/135 |
| 6,151,073 A | * | 11/2000 | Steinberg et al. | 348/371 |
| 6,831,699 B2 | * | 12/2004 | Chang et al. | 348/373 |
| 2002/0005907 A1 | * | 1/2002 | Alten | 348/333.11 |
| 2002/0013161 A1 | * | 1/2002 | Schaeffer et al. | 455/557 |
| 2002/0106202 A1 | * | 8/2002 | Hunter | 396/56 |
| 2005/0229103 A1 | * | 10/2005 | King | 715/741 |

* cited by examiner

*Primary Examiner*—David L Ometz
*Assistant Examiner*—Nicholas G Giles
(74) *Attorney, Agent, or Firm*—Coats & Bennet, P.L.L.C.

(57) ABSTRACT

A hand-held accessory for a camera-equipped device comprises a short-range transceiver to transmit signals to and receive signals from the camera-equipped device. A controller and a display are operatively connected to the short-range transceiver. The controller generates control signals responsive to user input, and conveys the control signals to the short-range transceiver for transmission to the camera-equipped device. The control signals control the camera functionality on the camera-equipped device. Images captured by the camera-equipped device may be displayed on the accessory display.

26 Claims, 5 Drawing Sheets

REMOTE CONTROL ACCESSORY FOR A CAMERA-EQUIPPED WIRELESS COMMUNICATIONS DEVICE

BACKGROUND

The present invention relates generally to accessories for camera-equipped wireless communications devices, and particularly to remote control units for camera-equipped wireless communications devices.

Wireless communications devices are now being equipped with an integrated camera. Like their conventional stand-alone counterparts, many of these devices include a shutter timer that may be set by the user when they wish to take a self-portrait. Traditionally, the user sets the shutter timer (e.g., 15 seconds), places the camera-equipped wireless communications device on a stable platform, and gets into position for the picture. When the timer expires, the shutter automatically activates to capture the image. The user then reviews the image and, if satisfied, saves the image.

Because the user cannot see the image before it is captured by the camera, taking self-portraits is a trial-and-error process. The user may be dissatisfied with the results of each trial. For example, too much light may leave the image appearing "over-exposed" or "washed-out," while too little light leaves the image looking dark. Additionally, users may capture their image only to discover that they had not properly centered themselves prior to the expiration of the shutter timer. What is needed is a remote control that permits the user to control the camera functions on the camera-equipped wireless communications device from a distance.

SUMMARY

The present invention addresses these issues by providing a hand-held accessory for a camera-equipped device. The accessory comprises a short-range transceiver, a controller, and a display. The controller and the display are operatively connected to the short-range transceiver. The short-range transceiver transmits signals to and receives signals from the camera-equipped device. The controller generates control signals responsive to user input, and conveys the control signals to the short-range transceiver for transmission to the camera-equipped device. The control signals control the camera-equipped device to capture images. The resultant images may then be sent back to the accessory via the short-range transceiver for display.

DETAILED DESCRIPTION

Figure 1:
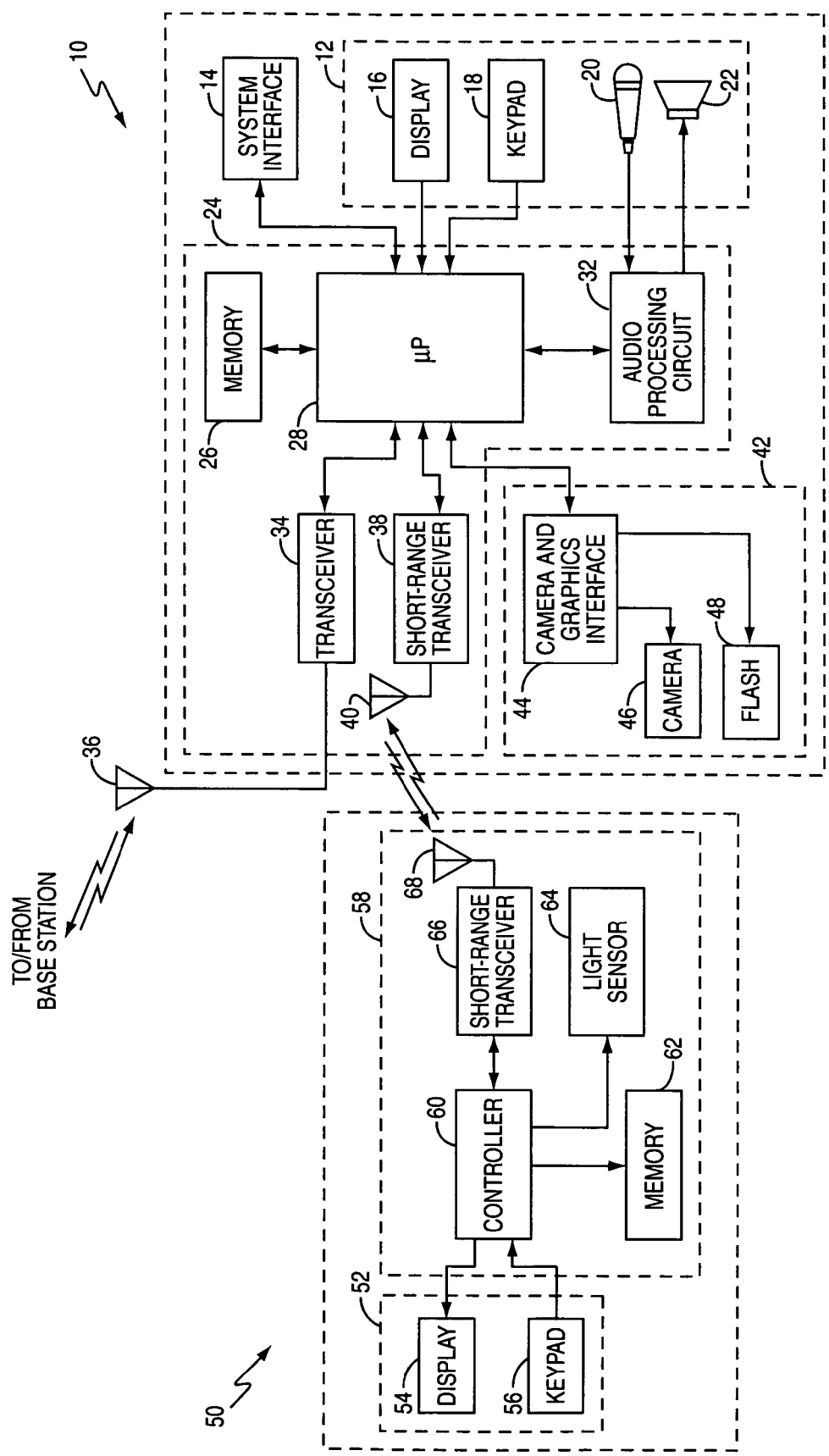
FIG. 1 illustrates a logical diagram of one embodiment of the present invention.

Referring now to the drawings, FIG. 1 illustrates a camera-equipped wireless communications device 10 having a hand-held remote control accessory 50 according to the present invention. While the figures illustrate device 10 in terms of a camera-equipped cellular telephone, those skilled in the art will readily appreciate that accessory 50 is applicable to any consumer electronics device having media imaging capability including, but not limited to, Personal Digital Assistants (PDA), palm or laptop computers, camcorders, and digital cameras. Further, the consumer electronics device need not have the camera integrally formed within the device 10, as accessory 50 may be used to control consumer electronics devices having external cameras.

Figure 2:
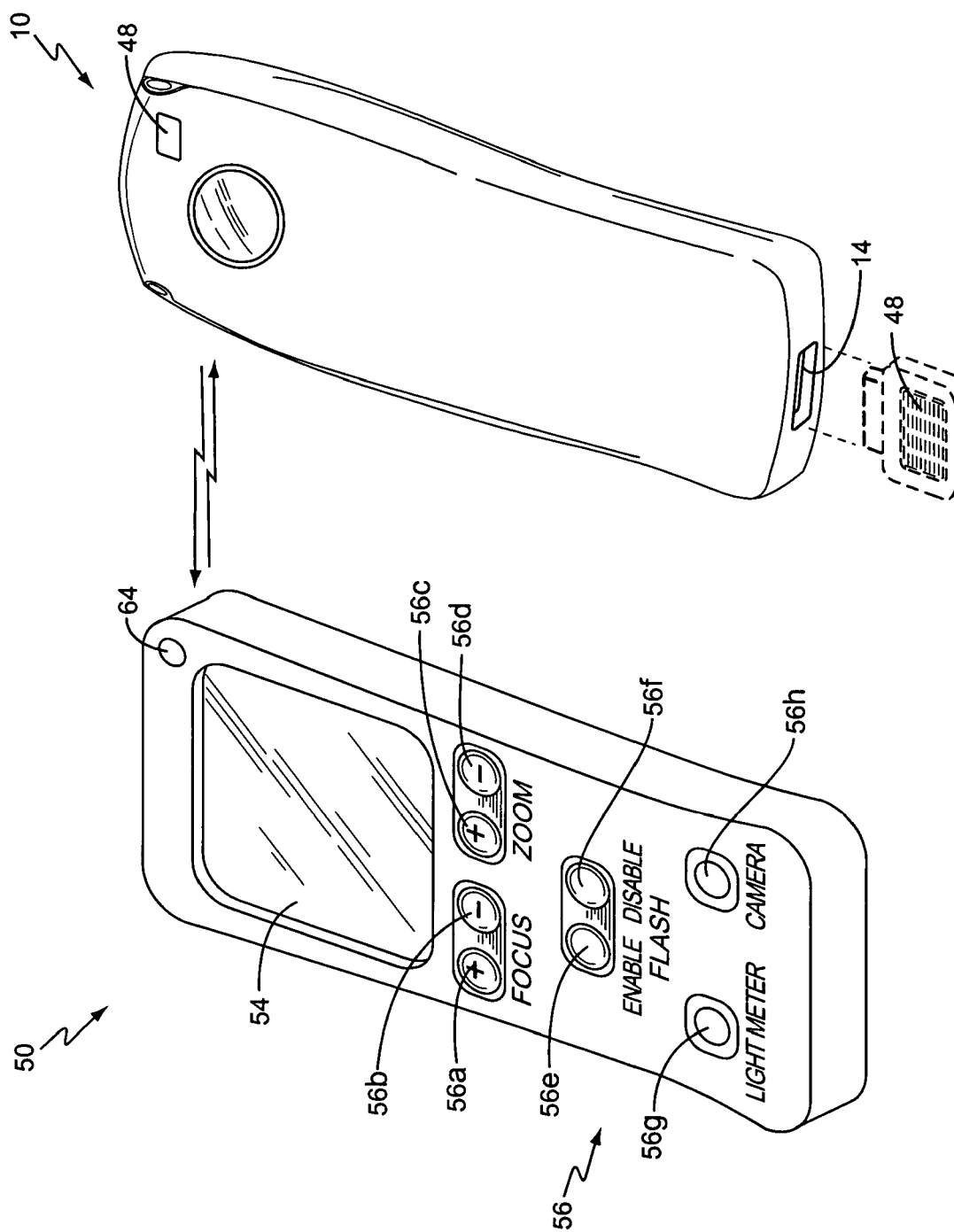
FIG. 2 illustrates a perspective view of one embodiment of the present invention.

As seen in FIG. 1, device 10 comprises a user interface 12, a system interface 14, communications circuitry 24, and a camera assembly 42. User interface 12 includes a display 16, a keypad 18, a microphone 20, and a speaker 22. Display 16 permits users to view dialed digits, call status, menu options, and other service information. Display 16 also acts as a viewfinder, and permits users to view images captured by camera assembly 42. Keypad 18, disposed on a face of device 10, includes an alphanumeric keypad and other input controls such as a joystick, button controls, or dials. Keypad 18 allows the operator to dial numbers, enter commands, and select options from menu systems. Additionally, keypad 18 permits the user to control the functionality of camera assembly 42. System interface 14 facilitates the connection of any number of desired accessories associated with device 10, such as a hands-free headset (not shown), external camera (not shown), and an external flash (FIG. 2). Microphone 20 converts the user's speech into electrical audio signals, and speaker 22 converts audio signals into audible sounds that can be heard by the user.

Communications circuitry 24 comprises memory 26, a microprocessor 28, an audio processing circuit 32, a long-range transceiver 34 having an antenna 36, and a short-range transceiver 38 having an antenna 40. Memory 26 represents the entire hierarchy of memory in device 10, and may include both random access memory (RAM) and read-only memory (ROM). Computer program instructions and data required for operation are stored in non-volatile memory, such as Erasable Programmable Read-Only Memory (EPROM), Electrically Erasable Programmable Read-Only Memory (EEPROM), and/or flash memory, and may be implemented as discrete devices, stacked devices, or integrated with microprocessor 28.

Microprocessor 28 controls the operation of device 10 according to programs stored in memory 26, and may use known techniques to digitally alter images captured by camera 46. The control functions may be implemented in a single microprocessor, or in multiple microprocessors. Suitable microprocessors may include, for example, both general purpose and special purpose microprocessors and digital signal processors. Microprocessor 28 may interface with audio processing circuit 32, which provides basic analog output signals to speaker 22 and receives analog audio inputs from microphone 20. Microprocessor 28, as will be described in more detail below, also controls the operation of camera assembly 42 responsive to control signals received from accessory 50 via short-range radio transceiver 38.

Long-range transceiver 34 is coupled to antenna 36 for receiving and transmitting signals from and to one or more base stations in a wireless communications network. Long-range transceiver 34 is a fully functional cellular radio transceiver, and operates according to any known standard, including Global System for Mobile Communications (GSM), TIA/EIA-136, cdmaOne, cdma2000, Universal Mobile Telecommunications System (UMTS), and Wideband Code Division Multiple Access (CDMA).

Short-range transceiver 38 is coupled to antenna 40 for transmitting and receiving signals to and from a corresponding short-range transceiver 66 associated with device 50. In one embodiment, short-range transceiver 38 is a BLUETOOTH transceiver or RF transceiver operating according to the IEEE 802.11(b) or 802.11(g) standards. As is well known in the art, BLUETOOTH is a universal radio interface that permits the creation of ad hoc networks, and is particularly well-suited for communications over short distances. For further details regarding BLUETOOTH technology, the interested reader may refer to "Bluetooth—The Universal Radio Interface for ad hoc, wireless connectivity," presented by Jaap Haartsen in Ericsson Review No. 3, 1998, which is herein incorporated by reference. It should be understood, however, that short-range transceivers 38, 66 may utilize any technology known in the art operable to transmit and receive signals over short distances, for example, infra-red, and hardwired cables.

Camera assembly 42 includes a camera 46, and an optional integrated flash 48. Camera 46 may be any camera assembly known in the art, and may include such elements as a lens assembly (not shown), an image sensor (not shown), and an image processor (not shown). Camera assembly 42 captures images that can be digitized and stored in memory 26, digitally altered by microprocessor 28 and/or controller 60, output to display 16, or transmitted over a wireless network via long-range transceiver 34. As will be described below, short-range transceiver 38 may transmit the captured images to accessory 50 responsive to control signals generated by accessory 50. Flash 48 emits a flash of light to illuminate, if required, the subject of the image being captured. As seen in FIG. 2, flash 48 need not be integrated within the housing of device 10, but can also comprise an external flash connected to system interface 14. Flash 48 is controllable to emit light at various luminosities responsive to control signals transmitted by accessory 50.

As stated above, conventional devices having camera functionality do not permit users to completely control the camera functions. For example, viewing a captured image requires the user to be in a position to see display 16 on the camera-equipped device itself. Other functionality, such as flash luminosity control, may not be user controllable at all. The present invention, however, deviates from conventional devices in that remote accessory 50 places control of the camera functions in the user's hands, even if the user is located a short distance away from the camera-equipped device.

Accessory 50 comprises a user interface 52 and circuitry 58. User interface 52 comprises a display 54 and a keypad 56. Keypad 56 provides the user with an interface in which to enter commands intended to control device 10. Like keypad 18, keypad 56 may also employ optional navigational controls, such as a joystick (not shown) or a navigation disk (not shown), that allow the user to navigate menu systems displayed on display 54. The controls on keypad 56 may include buttons, as seen in FIG. 2, or touch-sensitive pads.

Display 54 is operatively coupled to short-range receiver 66 via controller 60, and is operable to display the images transmitted by device 10. In one embodiment, display 54 comprises a liquid crystal display (LCD), such as a passive-matrix display or an active-matrix display. In an alternate embodiment, display 54 comprises a touch-sensitive screen. Implementing the display 54 as a touch-sensitive screen, while not required, permits display 54 to be larger. Further, software controls displayed on display 54 and its associated software programs stored in memory 62 may replace the controls placed on keypad 56, although this too is not required. Both LCD and touch-sensitive technologies are well known in the art, and thus, no further description is needed here. Other technologies may be used to implement display 54 as needed or desired.

Circuitry 58 comprises a controller 60, memory 62, a light sensor 64, and a short-range transceiver 66 coupled to an antenna 68. Memory 62 is largely similar to memory 26 of device 10. Likewise, short-range transceiver 66 and antenna 68 are comparable to their counterparts 38, 40. As such, no further discussion is needed with respect to memory 62, short-range transceiver 66, and antenna 68.

Light sensor 64 comprises any light sensitive device known in the art, for example, a photocell, and cooperates with controller 60 to measure light. These cells typically output a voltage that is proportional to the amount of light that hits them. As described in more detail later, measuring the output voltage allows accessory 50 and/or device 10 to determine the amount of light that will be required to capture a given image.

Controller 60 comprises, for example, a microprocessor that may access executable programs and data stored in memory 62. Controller 60 generates control signals responsive to user input on keypad 56, or alternatively, display 54 when display 54 is a touch-sensitive screen. Controller 60 also generates control signals responsive to an output voltage from light sensor 64 when measuring light, and may use known techniques to digitally alter images captured by camera 46. Regardless of how the user input is accepted, however, control signals are passed to short-range transceiver 66 for transmission to device 10 via antenna 68. These control signals are received by device 10, and then used to capture images, adjust light intensity from flash 48, focus, and zoom. Controller 60 also conveys signals received by short-range transceiver 66 from device 10. For example, device 10 may send signals representative of the image captured to accessory 50 at a selected resolution for display to the user. The selected resolution depends upon the control signal generated by controller 60.

FIG. 2 illustrates one embodiment of accessory 50 and device 10 as they may appear to a user. This embodiment shows keypad 56 as having push-button type controls 56a-56h to accept user input. Controller 60 will generate a control signal corresponding to the particular button pushed, and send the control signal to device 10.

In more detail, focus buttons 56a, 56b cause controller 60 to generate control signals that are transmitted to device 10 to adjust the focus. Device 10 sends an image to accessory 50 for display on display 54 as it would be seen if the user were looking through a viewfinder. Zoom buttons 56c, 56d permit the user to remotely control camera 46 to zoom in and out. Again, display 54 will display the signals received from device 10 as if the user were viewing the subject through a viewfinder. Flash buttons 56e, 56f permit the user to selectively enable and disable flash 48 on device 10. Light sensor control 56g and shutter-trigger control 56h permit the user to remotely control the intensity of flash 48, and capture images with camera 46.

Figure 3A:
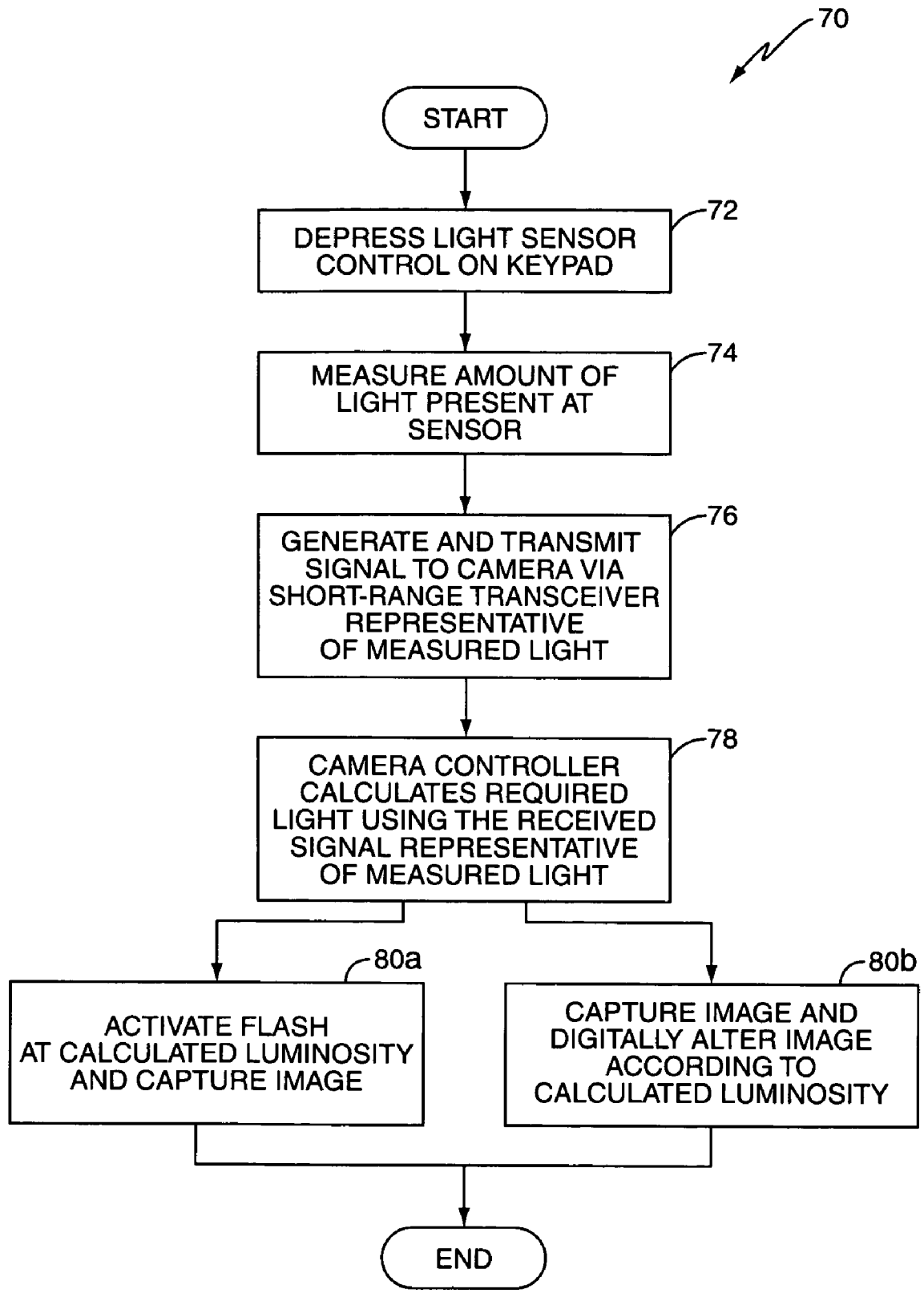
FIG. 3A illustrates a possible method of using one embodiment of the present invention to remotely control the luminosity of a flash associated with the camera-equipped device.

FIG. 3A illustrates a possible method 70 of using light sensor control 56g to control the luminosity of flash 48 according to one embodiment of the present invention. Controlling the luminosity prevents images from appearing over-exposed, and permits device 10 to realize savings in battery power. Depressing light sensor control 56g (box 72) generates a signal that causes circuitry associated with light sensor 64 to measure the amount of ambient light hitting light sensor 64, and generate a signal to the controller 60 (box 74). As stated above, the signal output to controller 60 may be a voltage indicative of the amount of light hitting light sensor 64. Controller 60 then generates a control signal according to the output signal from light sensor 64, and transmits it to device 10 via the short-range transceiver 66 (box 76). The microprocessor 28 then uses this control signal to determine how much light, if any, flash 48 is actually required to emit to properly illuminate the image subject (box 78). For example, the microprocessor 28 may reference the luminosity measured by the light sensor 64 to the known luminosity of the flash 48, and adjust the strength of flash 48 accordingly. Brighter conditions will require less illumination or no illumination, while darker conditions may require more illumination. In one embodiment, when the user activates device 10 to capture the image, microprocessor 28 will control flash 48 to provide only the amount of luminosity necessary (box 80a). In another embodiment, microprocessor 28 does not activate the flash, but rather, captures the image and performs known digital techniques to brighten and/or darken the captured image (80b).

Figure 3B:
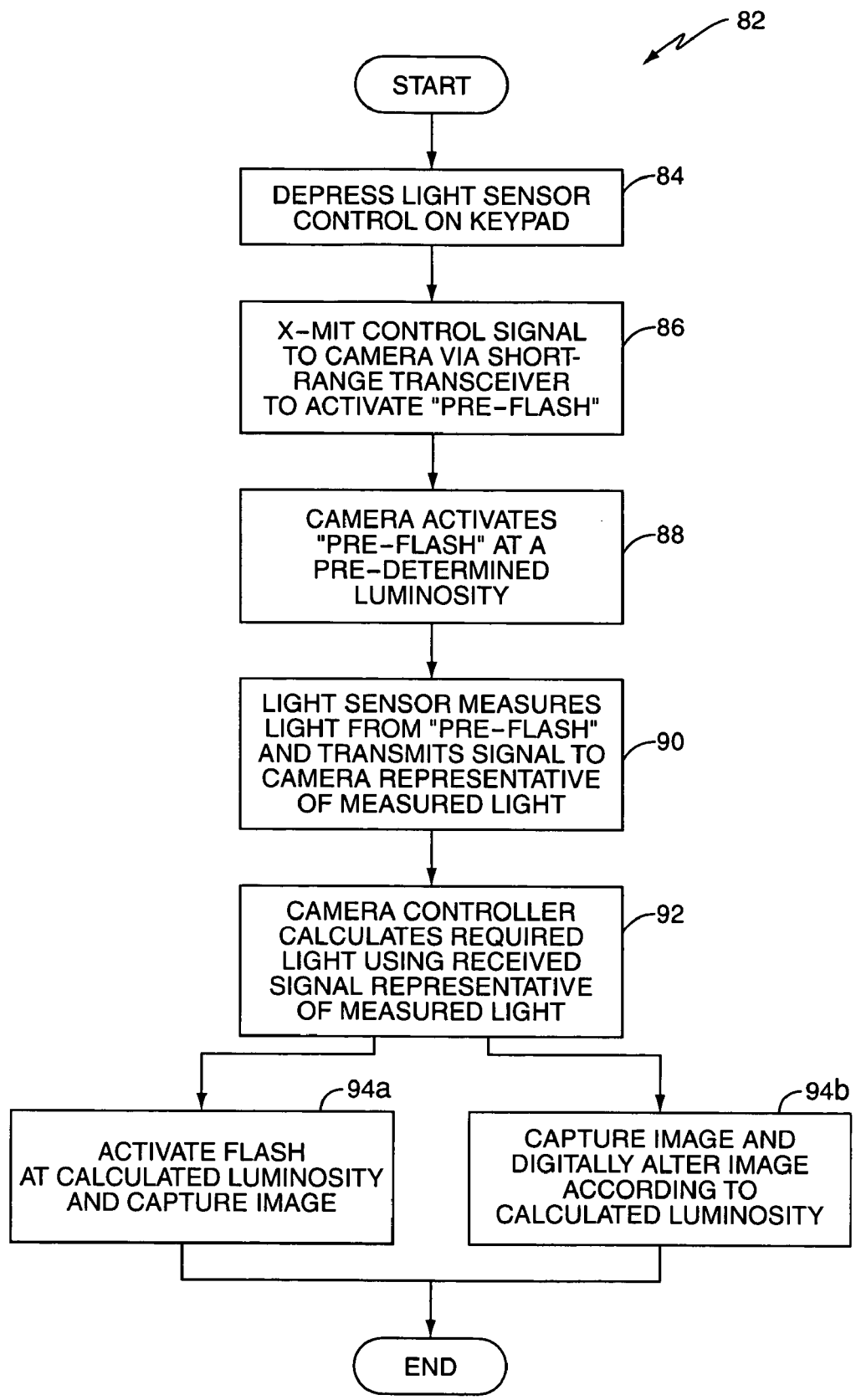
FIG. 3B illustrates an alternate method of using one embodiment of the present invention to remotely control the luminosity of a flash associated with the camera-equipped device.

FIG. 3B illustrates an alternate method 82 of controlling the luminosity of flash 48 from accessory 50. When the user depresses light sensor control 64 (box 84), controller 60 generates and transmits a control signal to instruct device 10 to emit a small "pre-flash" (box 86). Device 10 will then cause flash 48 to emit the pre-flash at a predetermined luminosity (box 88). Light sensor 64 will detect the light from the pre-flash, and output a signal representative of the amount of light hitting the light sensor 64. Controller 60 then generates and transmits a corresponding control signal to device 10 (box 90). The microprocessor 28 then calculates how much light is required (box 92), and when the user activates device 10 to capture the image, microprocessor 28 activates flash 48 to provide only the necessary amount of luminosity (box 94a). As above, microprocessor 28 may also digitally alter the image using known techniques to brighten and darken the image accordingly (box 94b).

Those skilled in the art should realize that determining the proper illumination is not a function relegated solely to microprocessor 28. The present invention also contemplates an embodiment where device 10 transmits a signal via the short-range transceiver 38 that is indicative of the predetermined luminosity. Controller 60 could determine the proper illumination by referencing the measured luminosity against a value received from device 10, and generate a control signal to device 10 that indicates the proper illumination level. Alternatively, controller 60 may also apply known digital altering techniques to alter the captured image.

The present invention is not limited to simply measuring either the ambient light or the light emitted by the pre-flash. An alternate embodiment of the present invention, for example, measures both the ambient light and the pre-flash. The resultant output voltage from light sensor 64 may be used to calculate the required amount of light needed for the image. Microprocessor 28 or controller 60 could then use this information to control the luminosity of flash 48 and/or digitally alter the captured image.

Figure 4:
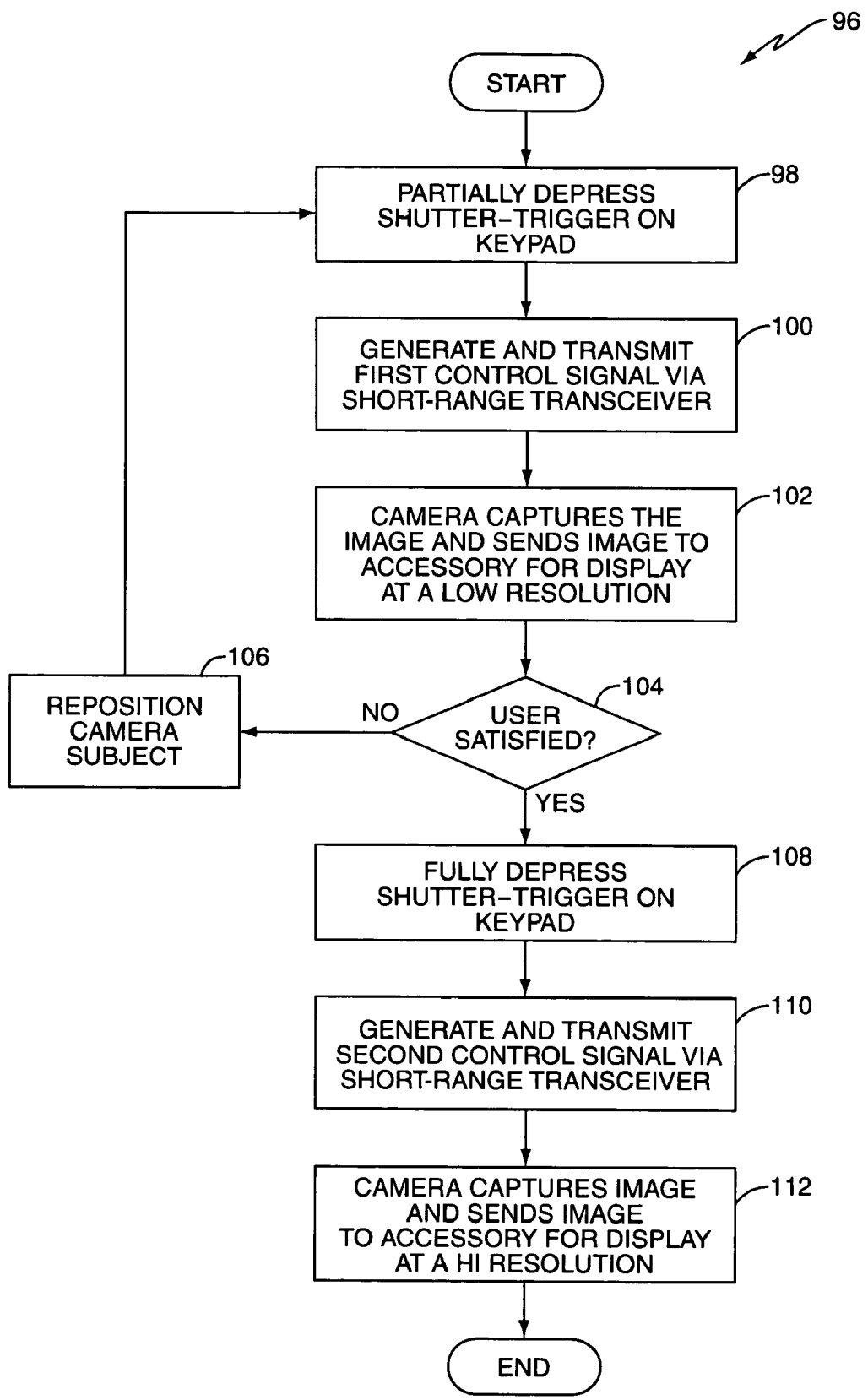
FIG. 4 illustrates a possible method of capturing an image remotely using one embodiment of the present invention.

The user may also control device 10 to capture images using shutter-trigger control 56h (FIG. 2). In one embodiment, shutter-trigger control 56h comprises a dual-position control. For example, a first position could be when the user partially depresses shutter-trigger control 56h (e.g., halfway down), while a second position could be when the user depresses shutter-trigger control 56h completely (e.g., all the way down). Of course, other types of controls and actuations may be substituted as desired. Controller 60 will generate first and second control signals responsive to the first and second positions of shutter-trigger control 56h, respectively, to control device 10 to capture an image. FIG. 4 illustrates one possible method 96 of controlling device 10 to capture an image, for example, a self-portrait.

After setting device 10 on a sturdy surface, the user moves to the front of device 10. The user may then adjust focus, zoom, and lighting as previously described. When the user is ready, the user may partially depress shutter-trigger control 56h (box 98) to cause controller 60 to generate and transmit via short-range transceiver 66, the first control signal to device 10 (box 100). Camera 46 then captures the image, and sends a preliminary low-resolution image back to accessory 50 for display on display 54 (box 102). Permitting the user to first view a low-resolution image allows the user to preview what the final image would look like before it is taken, and adjust focus, zoom, lighting, or setting as needed (boxes 104, 106). If satisfied, however, the user simply fully depresses the shutter-trigger control 56h (box 108) to cause controller 60 to generate a second control signal. The short-range transceiver 66 transmits the second control signal to device 10 (box 110), which then captures the image and sends the captured image back to accessory 50 at a high resolution. The short-range transceiver 66 receives the high resolution image from device 10, and forwards the image to display 54 for display at the hi-resolution (box 112).

It should be noted that the previous embodiments illustrate measuring the ambient light and/or pre-flash before capturing the low-resolution and/or hi-resolution image. However, measuring the ambient light and/or pre-flash might also occur after the image is captured. In these embodiments, microprocessor 28 or controller 60 may apply known techniques to digitally brighten or darken the captured image. Further, alternate embodiments of the present invention do not require the user to manually depress a separate actuator to measure the light. Rather, controller 60 may be configured to activate light sensor 64 automatically when capturing the image. Microprocessor 28 or controller 60 could then generate the corresponding signals that control flash 48 and/or perform digital altering techniques as desired.

Further, accessory 50 is not limited solely to displaying a single still image on display 54. Rather, the present invention may display a plurality of images successively captured and sent from device 10 depending upon an allowed bit-rate and resolution. Displaying the successively captured images as they are received from device 10 might appear to the user of accessory 50 as a "live action" video on display 54. In one embodiment, for example, the user partially depresses shutter-trigger control 56h to generate the first control signal as described above. Responsive to the first control signal, camera 46 periodically captures successive images, and sends the captured images to accessory 50 via short-range transceiver 38. Display 54 could display each of the captured images at a selected resolution until the user releases the partially depressed shutter-trigger control 56h, or until the user fully depresses shutter-trigger control 56h.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A hand-held accessory for a camera-equipped cellular communication device comprising:
   a short-range transceiver to transmit signals to and receive signals from the camera-equipped cellular communication device having a flash;
   a light sensor configured to measure light emitted by the flash device;
   a controller operatively coupled to the short-range transceiver and configured to generate control signals to remotely control the camera-equipped device to:
      activate the flash to emit light at a first predetermined luminosity to be measured by the light sensor;
      control the camera-equipped device to adjust the intensity of the flash to a second luminosity responsive to the amount of light measured by the light sensor; and
      activate the flash to emit light at a second luminosity to capture an image, the second luminosity being based on the amount of measured light; and
   a display operatively coupled to the short-range transceiver to display the captured image.

2. The accessory of claim 1 wherein the short-range transceiver communicates with a corresponding short-range transceiver associated with the camera-equipped device using a short-range wireless interface.

3. The accessory of claim 1 further comprising a user interface operatively coupled to the controller to accept user input.

4. The accessory of claim 3 wherein the controller generates the control signals responsive to the user input.

5. The accessory of claim 3 wherein the user interface comprises a keypad.

6. The accessory of claim 3 wherein the user interface comprises a touch-sensitive screen.

7. The accessory of claim 1 wherein the control signals comprise first and second control signals that are generated responsive to first and second user inputs, respectively.

8. The accessory of claim 7 wherein the first and second control signals control the camera-equipped device to send the captured image to the display at first and second resolutions, respectively.

9. The accessory of claim 8 wherein the first resolution is lower than the second resolution.

10. The accessory of claim 1 wherein the control signals further remotely control a zoom function on the camera-equipped device.

11. The accessory of claim 1 wherein the control signals further remotely control a focus adjustment on the camera-equipped device.

12. The accessory of claim 1 wherein the control signals further remotely enable and disable a flash on the camera-equipped device.

13. The accessory of claim 1 wherein the controller digitally alters the captured image.

14. The accessory of claim 1 wherein the display comprises a LCD.

15. The accessory of claim 14 wherein the display is operative to display the captured images at a plurality of resolutions.

16. A method of remotely controlling a camera-equipped cellular communication device using a hand-held accessory comprising:
   generating control signals to:
      remotely activate a flash device associated with a camera-equipped cellular communication device to emit light at a first predetermined luminosity to be measured by a light sensor at a hand-held accessory;
      remotely control the camera-equipped device to adjust the intensity of the flash device to a second luminosity responsive to the amount of measured light; and
      remotely activate the flash device to emit light at the second luminosity to capture an image;
   transmitting the control signals to the camera-equipped device using a short-range transceiver;
   receiving signals from the camera-equipped device using the short-range transceiver; and
   displaying the captured image on a display of the hand-held accessory.

17. The method of claim 16 wherein generating control signals comprises generating a first control signal responsive to a first user input, and a second control signal responsive to a second user input.

18. The method of claim 17 further comprising controlling the camera-equipped device to send the captured image to the display at first and second resolutions responsive to the first and second control signals, respectively.

19. The method of claim 18 wherein the first resolution is lower than the second resolution.

20. The method of claim 16 further comprising digitally altering the captured image for display.

21. The method of claim 16 further comprising generating the control signals responsive to user input.

22. The method of claim 16 further comprising controlling a zoom function of the camera-equipped device via the control signals.

23. The method of claim 16 further comprising controlling a focus adjustment of the camera-equipped device via the control signals.

24. The method of claim 16 further comprising enabling and disabling a the flash device associated with the camera-equipped device via the control signals.

25. The method of claim 16 further comprising displaying the captured image at a plurality of resolutions.

26. The method of claim 16 wherein the short-range transceiver communicates with the camera-equipped device using a short-range wireless interface.

* * * * *